United States Patent
Li et al.

(10) Patent No.: US 8,462,864 B2
(45) Date of Patent: Jun. 11, 2013

(54) OFDM TRANSMITTER AND METHODS FOR REDUCING THE EFFECTS OF SEVERE INTERFERENCE WITH SYMBOL LOADING

(75) Inventors: Qinghua Li, San Ramon, CA (US); Huaning Niu, Milpitas, CA (US); Yuan Zhu, Beijing (CN); Xintian E. Lin, Palo Alto, CA (US); Xiaogang Chen, Beijing (CN); Alexei Vladimirovich Davydov, Nizhny Novgorod (RU); Thomas J. Kenney, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 12/889,651

(22) Filed: Sep. 24, 2010

(65) Prior Publication Data

US 2011/0158337 A1    Jun. 30, 2011

Related U.S. Application Data

(60) Provisional application No. 61/291,787, filed on Dec. 31, 2009.

(51) Int. Cl.
*H04L 27/28* (2006.01)
*H04L 25/03* (2006.01)
*H04B 15/00* (2006.01)

(52) U.S. Cl.
USPC .......................................................... 375/260

(58) Field of Classification Search
None
See application file for complete search history.

(56) References Cited

U.S. PATENT DOCUMENTS

| | | | | |
|---|---|---|---|---|
| 7,376,193 B2 * | 5/2008 | Lee et al. | ....................... | 375/260 |
| 7,512,185 B2 * | 3/2009 | Sharon et al. | .................. | 375/260 |
| 8,023,523 B2 * | 9/2011 | Peng et al. | ..................... | 370/430 |
| 8,045,632 B2 * | 10/2011 | Batra et al. | .................... | 375/260 |
| 8,125,886 B2 * | 2/2012 | Yang et al. | .................... | 370/208 |
| 8,165,075 B2 * | 4/2012 | Han et al. | ...................... | 370/329 |
| 2006/0280113 A1 * | 12/2006 | Huo | ............................. | 370/208 |
| 2007/0230594 A1 * | 10/2007 | Mo et al. | ....................... | 375/260 |
| 2008/0232490 A1 * | 9/2008 | Gross et al. | ................... | 375/260 |
| 2008/0317168 A1 * | 12/2008 | Yang et al. | .................... | 375/298 |
| 2009/0022242 A1 * | 1/2009 | Waters et al. | ................. | 375/299 |
| 2009/0034456 A1 * | 2/2009 | Peng et al. | .................... | 370/329 |
| 2009/0129499 A1 * | 5/2009 | Kwak et al. | ................... | 375/267 |
| 2009/0175160 A1 * | 7/2009 | Iraji et al. | ...................... | 370/208 |
| 2010/0202493 A1 * | 8/2010 | Soliman et al. | ............... | 375/130 |
| 2010/0322287 A1 * | 12/2010 | Truong et al. | ................. | 375/133 |
| 2011/0044376 A1 * | 2/2011 | Lin et al. | ....................... | 375/130 |
| 2011/0129032 A1 * | 6/2011 | Batra et al. | .................... | 375/298 |
| 2011/0268215 A1 * | 11/2011 | Khojastepour | ............... | 375/267 |
| 2012/0128035 A1 * | 5/2012 | Soliman et al. | ............... | 375/135 |

* cited by examiner

*Primary Examiner* — David C. Payne
*Assistant Examiner* — Bahman Badipour
(74) *Attorney, Agent, or Firm* — Schwegman, Lundberg & Woessner, P.A.; Gregory J. Gorrie (57) ABSTRACT

Embodiments of an OFDM transmitter and method of reducing the effects of interference on subcarriers in an OFDM system by symbol loading are disclosed herein. A linear transformation is performed on a group of two or more input data symbols to generate a corresponding two or more output data symbols. Each of the output data symbols has an increased number of constellation points and are configured for transmission within one of the different signal dimensions using two or more antennas. Each of the two or more output data symbols carry the information of each of the input data symbols of the group. This coding together of input data symbols that are mapped to different signal dimensions may provide improved reliability against fading and severe interference. The different signal dimensions may comprise a frequency, a time and/or a space dimension.

23 Claims, 5 Drawing Sheets

OFDM TRANSMITTER AND METHODS FOR REDUCING THE EFFECTS OF SEVERE INTERFERENCE WITH SYMBOL LOADING

PRIORITY CLAIM

This application claims priority under 35 U.S.C. 119(e) to U.S. Provisional Patent Application Ser. No. 61/291,787 filed Dec. 31, 2009, reference number P33337Z, which is incorporated herein by reference in its entirety.

TECHNICAL FIELD

Embodiments pertain to multicarrier wireless communications. Some embodiments relate to wireless networks that communicate using orthogonal frequency division multiplexed (OFDM) signals. Some embodiments relate to WiFi wireless networks including those configured in accordance one of the IEEE 802.11 standards including the IEEE 802.11ac proposed standard. Some embodiments relate to WiMAX wireless networks including those configured in accordance one of the IEEE 802.16 standards. Some embodiments relate to LTE wireless networks including those configured in accordance one of the 3GPP E-UTRA communication standards.

BACKGROUND

Multicarrier wireless networks use a plurality of individual carriers (subcarriers) for communicating data symbols. When severe interference or deep fading is present on any one of the subcarriers, the data symbol transmitted on that subcarrier may not be able to be recovered.

Interference is particularly an issue with WiFi networks because they operate in unlicensed portions of the frequency spectrum. Interferers can jam a portion of frequency band or some of the spatial channels. Furthermore, channel allocations of nearby WiFi networks may partially overlap resulting in interference in a significant portion of the bandwidth (up to ⅔ of the subcarriers). In some cases an entire packet may be lost due, regardless of how good the channel quality may be on the other subcarriers because the error-correcting (e.g., convolutional) code may not be able to tolerate loosing most or all the bits that are transmitted on the jammed subcarriers.

Thus, there are general needs for transmitters and methods of reducing the effects of interference in a wireless network. There are also general needs for transmitters and methods of reducing the effects of interference in a wireless network that provide for improved throughput and reliability against severe interference and fading.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims. In accordance with embodiments, data symbols on multiple signal dimensions are coded together for improving reliability against fading and severe interference. The signal dimensions include time, frequency, and space. These embodiments are described in more detail below.

Figure 1:
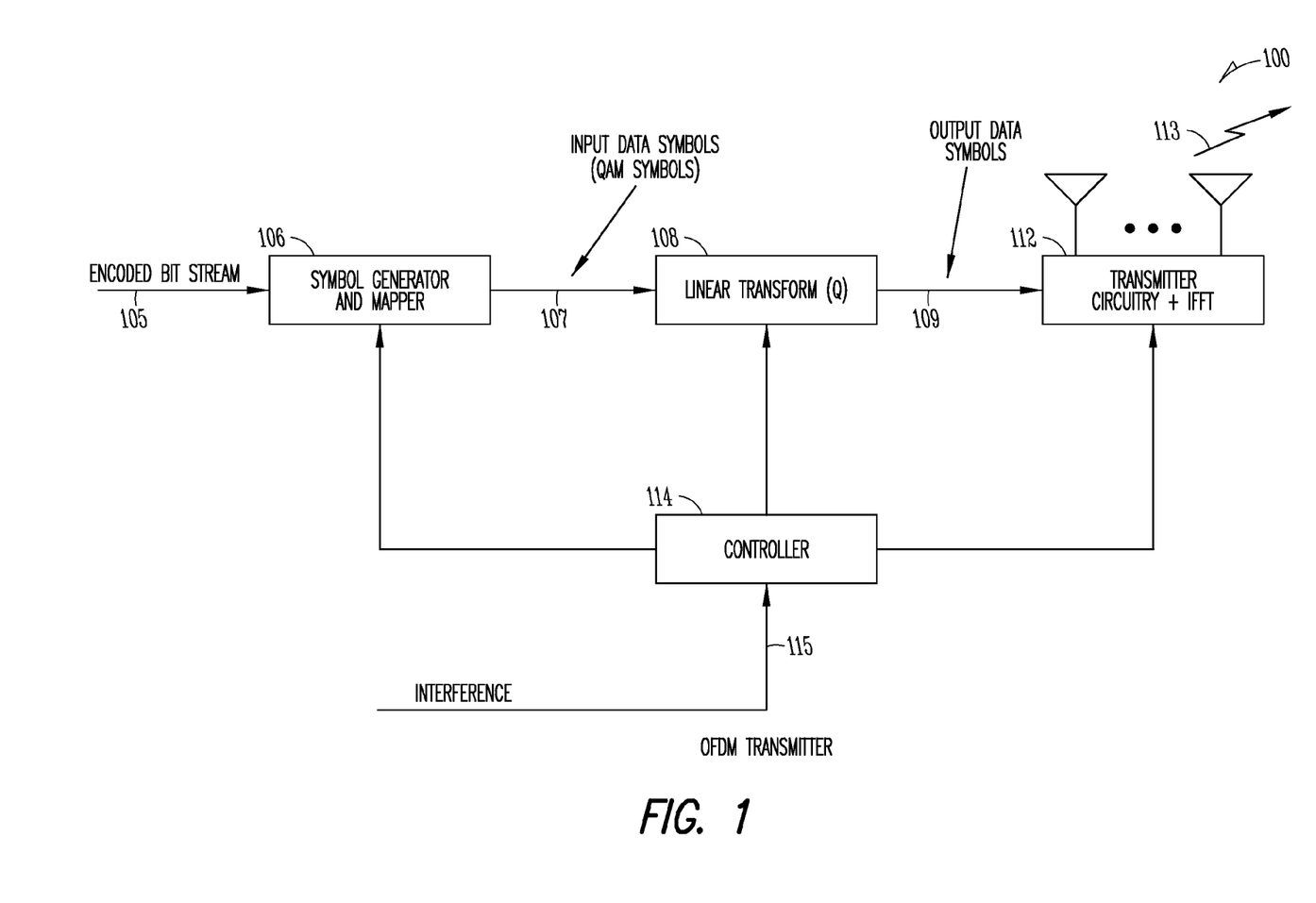
FIG. 1 is a functional diagram of an OFDM transmitter in accordance with some embodiments.

FIG. 1 is a functional diagram of an OFDM transmitter in accordance with some embodiments. The OFDM transmitter 100 may include symbol generator and mapper 106, linear transform circuitry 108, transmitter circuitry 112 and a controller 114, among other things. The OFDM transmitter 100 may be configured to transmit OFDM symbols on a plurality of subcarriers of multicarrier communication channel. The symbol generator and mapper 106 may generate modulation symbols from bits of an encoded bit stream 105. The modulation symbols may be QAM symbols. Each of the modulation symbols may have a number of constellation points depending on their symbol-modulation level and may be referred to as an input data symbol 107. The linear transform circuitry 108 may perform a linear transformation on a group of two or more input data symbols 107 that are mapped to different signal dimensions to generate a corresponding two or more output data symbols 109. Each of the output data symbols 109 has an increased number of constellation points. The transmitter circuitry 112 may be configured to transmit each of the output data symbols 109 within one of the different signal dimensions.

The linear transformation may be configured so that each of the two or more output data symbols 109 carry all the information of each of the input data symbols 107 of the group. This coding together of groups of input data symbols 107 that are mapped to different signal dimensions provides for improved reliability against fading and interference by symbol loading the output data symbols 109.

In some embodiments, the different signal dimensions may comprise a frequency, a time or a space dimension. A combination of one or more of the different signal dimensions may be used. When the different signal dimension comprises the frequency dimension, the group of two or more input data symbols 107 are initially mapped to different subcarriers. When the different signal dimensions comprise the time dimension, the group of two or more input data symbols 107 is initially mapped to different OFDM symbols. When the different signal dimensions comprise the space dimension, the group of two or more input data symbols 107 is initially mapped to different spatial channels. In some embodiments, the two or more input data symbols may be mapped to a single one of the signal dimensions (e.g., the frequency dimension), while in other embodiments, the input data symbols may be mapped to a combination of two or more of the different signal dimensions.

Figure 2:
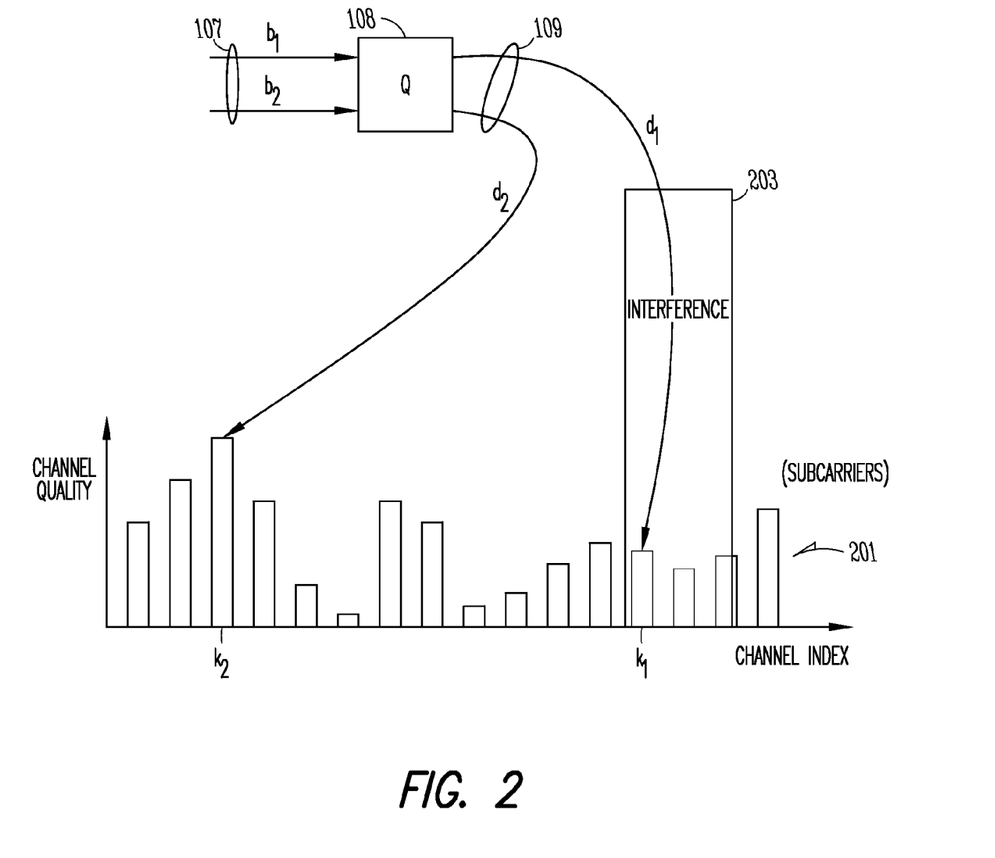
FIG. 2 illustrates symbol loading in accordance with some embodiments.

When the signal dimension comprises the frequency dimension, the group of two or more input data symbols 107 is initially mapped to non-adjacent subcarriers and transmitter circuitry 112 is configured to modulate each output data symbol 109 for transmission on one of the non-adjacent subcarriers. Each of the non-adjacent subcarriers carry the information from each of the input data symbols 107 of the group. Information that would be lost due to severe interference on any one of the subcarriers can be recovered since it is transmitted on another subcarrier. The increased number of constellation points of each of the output data symbols 109 allows the subcarriers to carry the information of the input data symbols 107 of the group. As described in more detail below, the linear transform may be selected so that each of the output data symbols 109 carry the information of the group of two or more input data symbols 107. As illustrated in FIG. 2, if subcarrier $k_1$ is jammed by interference 203, the information from input data symbols 107 ($b_1$ and $b_2$) may be recovered on subcarrier $k_2$ since output data symbol $d_2$ includes the information of both input data symbols $b_1$ and $b_2$.

In some embodiments, the linear transformation may be configured such that the number of constellation points of each output data symbol 109 comprises a product of the number of constellation points of each of the input data symbols 107 of the selected group. For example, when a linear transformation is performed on two input data symbols 107 to generate two output data symbols 109, the number of constellation points of each of the output data symbols is $N_1 \times N_2$ where $N_1$ is the number of constellation points of one of the input data symbols and $N_2$ is the number of constellation points of the other input data symbol. In an example in which each input symbol has two constellation points, each output symbol would have four constellation points. In an example in which each input symbol has three constellation points, each output symbol would have nine constellation points. In an example in which each input symbol has four constellation points, each output symbol would have sixteen constellation points. The scope of the embodiments is not limited to performing linear transformations on input data symbols that have the same number of constellation points. For example, when adaptive bit loading is employed, if one input data symbol of a selected group of two input data symbols 107 has two constellation points and the other input data symbol of the selected group has three constellation points, each of the output data symbols may have six constellation points.

In some embodiments, the linear transformation comprises multiplying the input data symbols 107 by a transformation matrix Q comprising one or more complex numbers. The transformation matrix may be selected so that each of the output data symbols 109 carry the information of the input data symbols 107. These embodiments are discussed in more detail below. In some embodiments, the transformation matrix may have a Frobenius norm that is a constant for transmit power normalization.

In some embodiments, the symbol generator and mapper 106 may generate a set of input data symbols 107. Each input data symbol of the set may be initially mapped to one of the subcarriers of a plurality of subcarriers that comprise a channel bandwidth. The controller 114 may select the group of input data symbols 107 from the set. The controller 114 may select the input data symbols 107 for the group that are mapped to subcarriers that are separated by a total number of subcarriers of the plurality divided by a number of input data symbols in the group to achieve a maximum subcarrier separation between the input data symbols selected for the group.

In embodiments that use two input data symbols 107 per group, the input data symbols 107 selected for a group may be separated by approximately one-half the total number of subcarriers. In embodiments that use three input data symbols 107 per group, the input data symbols 107 selected for a group may be separated by approximately one-third the total number of subcarriers. In embodiments that use four input data symbols 107 per group, the input data symbols 107 selected for a group may be separated by approximately one-fourth the total number of subcarriers. The output data subcarriers 109 would have the same subcarrier separation as the subcarrier separation of the input data symbols 107 since the output data symbols are modulated on those subcarriers.

In some embodiments, the controller 114 is configured to select additional groups of input data symbols from the set of input data symbols 107 and cause the linear transform circuitry 108 to perform the linear transformation of each group of selected input data symbols to generate corresponding groups of output data symbols 109. When the signal dimension is the frequency dimension, each group of selected input data symbols corresponds to different non-adjacent subcarriers each input data symbol of the set is mapped to one subcarrier of the plurality of subcarriers that comprise the channel bandwidth.

In some embodiments, the additional groups of input data symbols may be selected from the set and the linear transform circuitry 108 may perform a linear transformation of each group of selected input data symbols to generate groups of output data symbols until output data symbols are generated for each subcarrier of the plurality. The output data symbols 109 are mapped to each subcarrier and the set of output data symbols 109 may comprise an OFDM symbol configured for transmission by the transmission circuitry 112. After pilot insertion, an IFFT may be performed on the set of output data symbols 109 to generate a time-domain output signal 113 for transmission that represents the OFDM symbol.

In some specific embodiments illustrated in FIG. 2, the group of input data symbols 107 may comprise two input data symbols ($b_1$ and $b_2$) that may be coded together. In these embodiments, the input data symbols 107 comprise first and second input data symbols ($b_1$, $b_2$) that are initially mapped (e.g., initially assigned) to first and second non-adjacent subcarriers ($k_1$, $k_2$) respectively. The output data symbols 109 may comprise first and second output data symbols ($d_1$, $d_2$) that may be configured for transmission on the first and second non-adjacent subcarriers ($k_1$, $k_2$), respectively. The increased number of constellation points of each of the output data symbols 109 allows both the first and the second non-adjacent subcarriers to carry all the information of both the first and second input data symbols 107. In this example embodiment, the output data symbols 109 each have twice the number of constellation points as each of input data symbols 107. In these embodiments, if the input data symbols 107 comprise two BPSK symbols, for example, the two output data symbols 109 may each comprise a 4-PSK symbol. In some of these embodiments, the first and second non-adjacent subcarriers are separated by up to half the number of subcarriers 201 that comprise the channel bandwidth.

In some example embodiments, the group of input data symbols 107 may comprise three input data symbols that are to be coded together. In these embodiments, the input data symbols 107 comprise first, second, and third input data symbols that are initially mapped to first, second, and third non-adjacent subcarriers, respectively. The output data symbols 109 comprise first, second, and third output data symbols configured for transmission on the first, second, and third non-adjacent subcarriers, respectively. The increased number of constellation points of each of the output data symbols 109 allows the first, second, and third subcarriers to carry all the information of the first, second, and third input data symbols 107. The first, second, and third non-adjacent subcarriers may be separated by up to one-third the number of subcarriers that comprise the channel bandwidth. In these embodiments, if each of the input data symbols 107 comprise three BPSK symbols, for example, the three output data symbols 109 may each have nine-constellation points.

In some alternate embodiments the number of output data symbols 109 generated by the linear transformation may be greater than the number of input data symbols 107 for increased reliability. In these embodiments, a non-square transformation matrix is used. For example, three input data symbols 107 may be transformed by a 5×3 linear transformation matrix to generate five output data symbols 109.

In some embodiments, the OFDM transmitter 100 may include circuitry to provide, determine or measure interference 115 within the channel bandwidth. When the interference 115 is below a threshold level, the controller 114 may cause the linear transform circuitry 108 to refrain from performing the linear transformation on the input data symbols 107 and cause the transmitter circuitry 112 to configure the input data symbols 107 for modulation on the non-adjacent subcarriers that the input data symbols 107 are initially mapped. In these embodiments, when the interference 115 is below a threshold level, no linear transformation is performed and there is no increase in the number of constellation points on the data symbols that are transmitted as the input data symbols 107 may be mapped directly in a one-to-one manner to output data symbols. In these embodiments, when the measured interference is at or above a threshold level, the linear transformation may be performed. The interference 115 may be the interference across the channel bandwidth or the interference for any one or more of the subcarriers. In some of these embodiments, the interference 115 may be determined based on the PER or a number of packet retransmissions (e.g., H-ARQs). In these embodiments, the coding together of input data symbols may be performed when the interference 115 across the bandwidth or on a particular subcarrier is severe. Severe interference for a particular subcarrier may be interference in which a symbol transmitted on that subcarrier is unable to be recovered because most or all the bits that are transmitted on the jammed subcarrier are lost. Severe interference may also be interference that causes a packet to be lost. In these embodiments, the threshold level for the measure interference may be a threshold level defining severe interference.

In some embodiments, when longer-term channel information is known, the controller 114 may be configured to identify subcarriers 201 with a better channel quality and subcarriers 201 with a poorer channel quality as illustrated in FIG. 2. The controller 114 may configure the linear transform circuitry 108 to apply a linear transformation with power-loading to provide an increased power level for the subcarriers with the better channel quality and to provide a reduced power level for subcarriers with the poorer channel quality. In these embodiments, since subcarrier $k_2$ (as illustrated in FIG. 2) has better channel quality and subcarrier $k_1$ has poorer channel quality, the linear transformation may be configured to provide an increased power level for subcarrier $k_2$ and a decreased power level for subcarrier $k_1$. In these embodiments, the subcarriers with the better channel quality may be subcarriers that have interference below a predetermined level, and the subcarriers with the poorer channel quality may be subcarriers that have interference at or above a predetermined level, although the scope of the embodiments is not limited in this respect.

In the embodiments illustrated in FIG. 1, the linear transformation is performed on mapped data symbols (i.e., input data symbols 107). In some alternate embodiments, the linear transformation may be performed on codebits of the encoded bit stream 105. In these alternate embodiments, symbol generator and mapper 106 may be provided in the data path after linear transform circuitry 108 (i.e., the positions of the symbol generator and mapper 106 and the linear transform circuitry 108 may be swapped).

Although the OFDM transmitter 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the OFDM transmitter 100 may refer to one or more processes operating on one or more processing elements.

Figure 3:
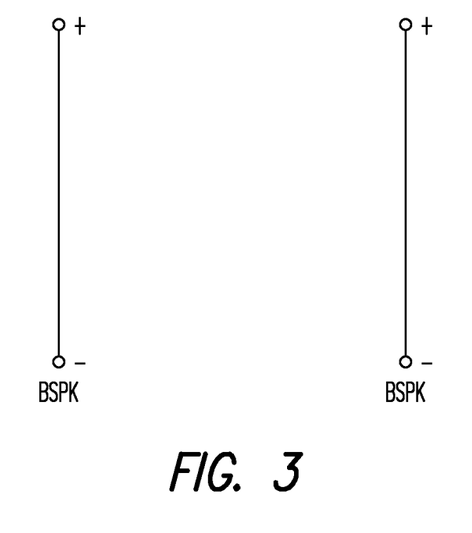
FIG. 3 illustrates constellation points of two data symbols mapped to two subcarriers in accordance with a conventional bit mapping technique.

FIG. 3 illustrates constellation points of two data symbols mapped to two subcarriers in accordance with a conventional bit mapping technique. In this example, each subcarrier employs a BPSK constellation for transmission of one codebit. If a code rate is ⅔ is used and one subcarrier is jammed or in a deep fade, the information bits may not be able to be recovered when the number of remaining bits is less than the number of information bits resulting in a loss of a packet. Embodiments disclosed herein improve the robustness of symbol transmissions in this example by loading the information of the both input codebits on both subcarriers as shown in FIG. 4.

Figure 4:
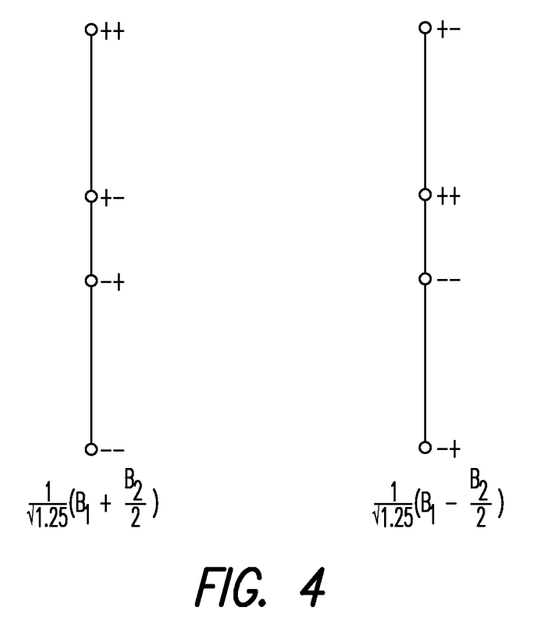
FIG. 4 illustrates the constellation points of the two data symbols of FIG. 3 after symbol loading in accordance with some embodiments.

FIG. 4 illustrates the constellation points of the two data symbols of FIG. 3 after symbol loading in accordance with some embodiments. Even if one subcarrier is jammed, the codebits may still be able to be detected and recovered if the other subcarrier is not experiencing severe interference (i.e., being jammed) or in deep fade. In this example, a rotation matrix is used as the linear transform for loading the codebit information on two subcarriers. In this example, the two input codebits are first mixed by a rotation matrix (i.e., performing a linear transformation) as shown below:

$$\frac{1}{\sqrt{1.25}}\begin{bmatrix} 1 & 0.5 \\ -0.5 & 1 \end{bmatrix},$$

The output data symbols may then be loaded onto the subcarriers as:

$$\begin{bmatrix} d_1 \\ d_2 \end{bmatrix} = \frac{1}{\sqrt{1.25}} \begin{bmatrix} 1 & 0.5 \\ -0.5 & 1 \end{bmatrix}\begin{bmatrix} b_1 \\ b_2 \end{bmatrix} \quad (1)$$

where $d_k$ is the symbol loaded to the $k^{th}$ subcarrier, and $b_k \in \{1,-1\}$ represents the binary codebit to be loaded to the $k^{th}$ subcarrier. The constellation of $d_k$ now has four points and each point specifies two bits of information as shown in FIG. 4. Even if one subcarrier is jammed, all the code-bits $b_k$ are present and can be potentially recovered from the other (non-jammed) subcarrier. It should be pointed out that not all rotation matrixes are suitable. For example, the loaded symbol of the rotation matrix $$\frac{1}{\sqrt{2}}\begin{bmatrix} 1 & 1 \\ -1 & 1 \end{bmatrix}$$

only has three constellation points $-\sqrt{2}$, 0, $\sqrt{2}$ and thus does not fully carry two bits of information.

In general, the output data symbols 109 may be generated by the following equation:

$$\begin{bmatrix} d_1 \\ \vdots \\ d_N \end{bmatrix} = Q \begin{bmatrix} s_1 \\ \vdots \\ s_M \end{bmatrix}, \quad (2)$$

where Q is a linear-transform matrix with one or more complex numbers, and $S_m$ is the $m^{th}$ input data symbol. In some embodiments, N (the number of output data symbols) may be greater than M (the number of input data symbols) for increased reliability. The matrix Q may be a unitary matrix or any other matrix whose Frobenius norm is a constant for transmit power normalization in which $$1 = \sum_{i,j}^{N,M} \|q_{i,j}\|^2.$$

Besides robustness, in some embodiments, the linear-transform matrix Q can also provide power loading. For example, $$Q = \begin{bmatrix} 1 & j \\ 0 & 0 \end{bmatrix}$$

loads all the power and information on a first subcarrier. The power loading may be useful when the OFDM transmitter 100 has long-term information about the channel quality of subcarriers or information regarding interference. Power loading may also be useful for beamforming or transmission on two or more spatial channels. In these embodiments, the controller 114 (FIG. 1) of the OFDM transmitter 100 (FIG. 1) may increase the power level of subcarriers with higher-channel quality and reduce the power level of subcarriers with lower-channel quality in a long-time average sense for slowly varying channels.

In some embodiments, the linear-transform matrix Q may be specific 2×2 unitary matrix:

$$Q = \begin{bmatrix} \cos\theta & \sin\theta \\ e^{j\beta}\sin\theta & -e^{j\beta}\cos\theta \end{bmatrix},$$

In these embodiments, $$\theta \in [0, 2\pi) \text{ and } \beta \in \left[0, \frac{\pi}{2}\right)$$

are angles that may be optimized according to long-term channel statistics and a particular modulation and coding scheme. The transmitted symbols (output data symbols 109) that each linear transformation produces may be separated in frequency for enhancing diversity. In fading channels, a maximum separation may be selected. For a 2×2 linear-transform matrix Q, the subcarrier separation may be up to approximately half of the channel bandwidth. In some alternate embodiments, the channel bandwidth of N subcarriers may be divided into blocks M blocks so there are N/M subcarriers per block. In these embodiments, the mapping may pair subcarrier number one and subcarrier M/2, etc. N may range from as little as fifty-two or less to more than several hundred. M may range from two to ten or more.

In addition to mixing codebits in the frequency dimension, embodiments are also applicable to mixing codebits in the time and space dimensions. For example, in the space dimension, codebits may be mixed across multiple spatial channels. In accordance with the IEEE 802.11n standard, unequal modulation orders are applied to different beamformed spatial channels for improving throughput. This results in additional overhead to feedback the modulation order of each beamformed channel and results in additional complexity to demultiplex the unevenly distributed bits. As a result, this feature is typically not supported in many IEEE 802.11n compatible products. Embodiments disclosed herein, through symbol loading, may remove the need for unequal modulation configurations. In these embodiments, the input data symbols 107 (FIG. 1) may have the same modulation and coding levels.

In these embodiments, a MIMO receiver can measure the rotated channel from the beamformed preambles and demodulate the loaded symbols using a conventional maximum-likelihood decoder. Thus, implementation complexity is simplified while providing at least comparable if not improved performance. Furthermore, power loading using a transformation matrix Q provides additional gain over conventional IEEE 802.11n techniques without any additional complexity and with less link adaptation overhead. Embodiments disclosed herein are also applicable to WiMAX and LTE systems across beamformed channels (the spatial signal dimension), across subcarriers (the frequency signal dimension) and across OFDM symbols (the time signal dimension).

Figure 5:
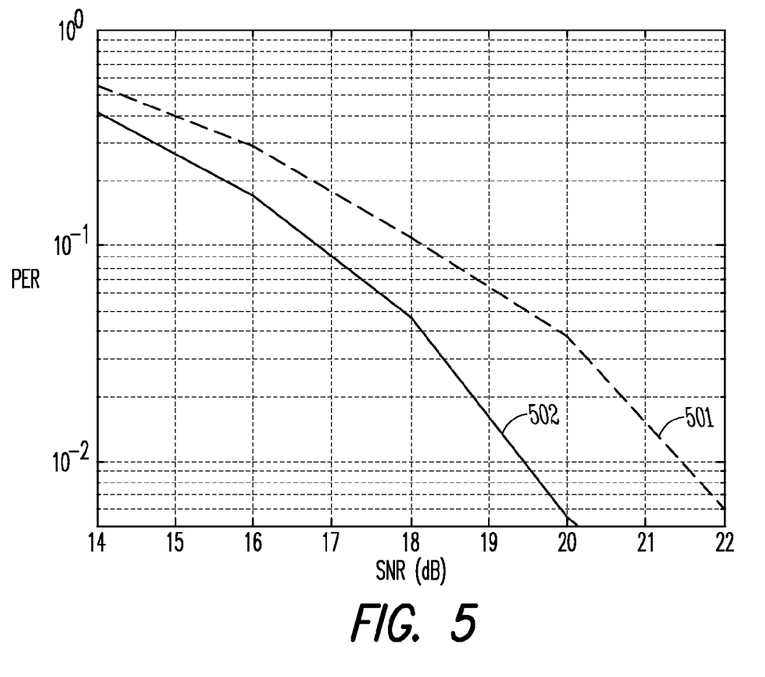
FIGS. 5, 6 and 7 show comparisons of simulated packet error rates (PERs) for various signal-to-noise ratios (SNR) in accordance with some embodiments.
Figure 6:
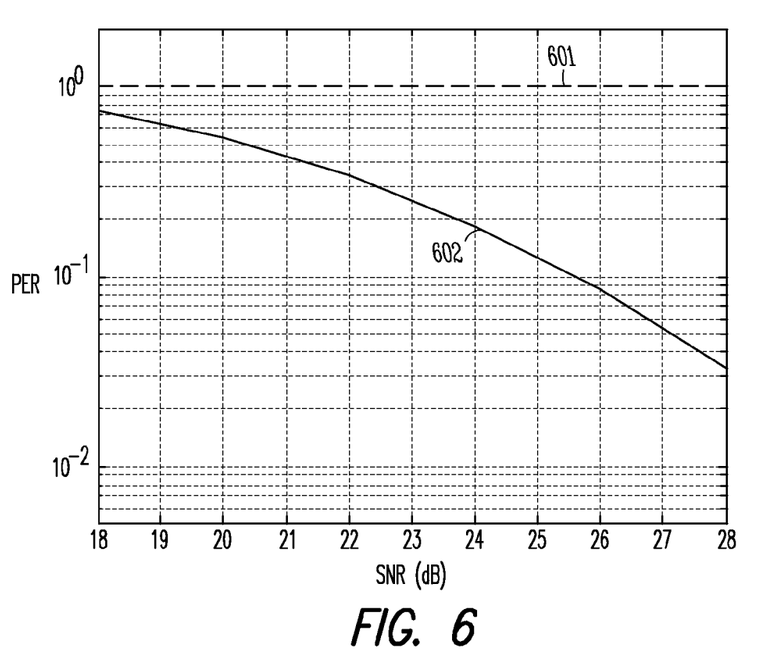
Figure 7:
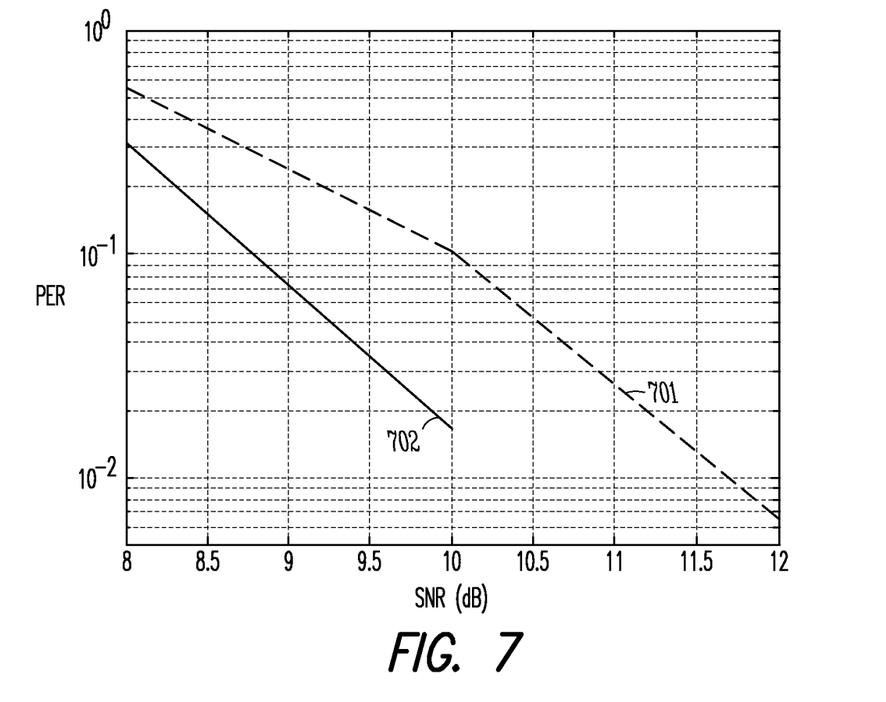

FIGS. 5, 6 and 7 show comparisons of simulated PERs for various SNRs in accordance with some embodiments. In FIG. 5, a QPSK modulation level, a code rate of ¾, and 1×1 antenna configuration are simulated. In FIG. 5, the PER for conventional bit mapping is illustrated by line 501 and the PER for bit mapping in accordance with an embodiment disclosed herein is illustrated by line 502. FIG. 5 illustrates a situation without interference.

In FIG. 6, a QPSK modulation level, a code rate of ¾, and 1×1 antenna configuration are simulated in a situation with interference. FIG. 6 illustrates PERs when ⅓ of the bandwidth is jammed (e.g., by a partially overlapped channel). In FIG. 6, the PER for conventional bit mapping is illustrated by line 601 and the PER for bit mapping in accordance with an embodiment disclosed herein is illustrated by line 602.

FIG. 7 shows PERs for beamformed channels. In FIG. 7, a QPSK modulation level, a code rate of ¾, and 4×2 antenna configuration with perfect beamforming are simulated. In FIG. 7, the PER for conventional bit mapping is illustrated by line 701 and the PER for bit mapping in accordance with an embodiment disclosed herein is illustrated by line 702. FIG. 7 illustrates performance across spatial channels.

In these simulations, the channel model is an IEEE 802.11n channel model D with non-line-of-sight (NLOS) occultation. The channel codes are 802.11 convolution codes. The packet size is 1000 bytes. The receiver is a 2×2 maximum likelihood architecture. The simulation results illustrated in FIGS. 5, 6, and 7 show an improvement in gain and a reduction in PER.

The improvement on high code rate schemes is apparent but the gain decreases for a code rate of ½. For the interference free simulation illustrated in FIG. 5, the gain is more than 1 dB for a 10% PER and about 2 dB at for a 1% PER when the code rate is above ½.

For the interference scenario illustrated in FIG. 6 with a code rate above ½, one third of the subcarriers are jammed by an adjacent band. In this scenario, transmissions that use conventional bit mapping are basically blocked (i.e., packet are lost). In contrast, acceptable PERs are achieved with the symbol loading in accordance with embodiments and a gain of more than 10 dB may be achieved. For fading channels, embodiments disclosed herein may improve the diversity order as illustrated by a steeper PER slope in FIG. 5. In the case of beamformed spatial channels, a 1.5 dB gain is observed at PER 10% as illustrated in FIG. 7.

The OFDM transmitter 100 (FIG. 1) may be a multicarrier transmitter that may transmit OFDM communication signals over a multicarrier communication channel. In some of these embodiments, OFDM transmitter 100 may be part of a wireless local area network (WLAN) communication station such as a wireless access point (AP), base station or a mobile device including a Wireless Fidelity (WiFi) device. In some of these multicarrier embodiments, the OFDM transmitter 100 may be part of a broadband wireless access (BWA) network communication station, such as a Worldwide Interoperability for Microwave Access (WiMax) communication station, although the scope of the invention is not limited in this respect as the OFDM transmitter 100 may be part of almost any wireless communication device.

In some embodiments, the OFDM transmitter 100 may communicate in accordance with specific communication standards, such as the Institute of Electrical and Electronics Engineers (IEEE) standards including IEEE 802.11 standards and/or proposed specifications for WLANs, although the scope of the invention is not limited in this respect as they may also be suitable to transmit and/or receive communications in accordance with other techniques and standards. In some embodiments, the OFDM transmitter 100 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

In some other embodiments, the OFDM transmitter 100 may be part of a Universal Terrestrial Radio Access Network (UTRAN) Long Term Evolution (LTE) (also known as 3GPP-LTE and E-UTRA) base station or mobile station. In these 3GPP-LTE embodiments, the OFDM transmitter 100 may communicate in accordance with the 3rd Generation Partnership Project (3GPP) standards for UTRAN-LTE, release 8, March 2008, including variations and evolutions thereof.

The OFDM transmitter 100 may be coupled to one or more directional or omnidirectional antennas, including, for example, dipole antennas, monopole antennas, patch antennas, loop antennas, microstrip antennas or other types of antennas suitable for transmission of OFDM signals. In some embodiments, instead of two or more antennas, a single antenna with multiple apertures may be used. In these embodiments, each aperture may be considered a separate antenna. In some multiple-input, multiple-output (MIMO) embodiments, the antennas may be effectively separated to take advantage of spatial diversity and the different channel characteristics that may result.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An OFDM transmitter comprising:
a symbol generator and mapper to map a group of two or more input data symbols to at least two different signal dimensions;
linear transform circuitry to perform a linear transformation on the group of input data symbols to generate a corresponding two or more output data symbols, each of the output data symbols having an increased number of constellation points;
transmitter circuitry to configure each output data symbol for transmission within the different signal dimensions using two or more antennas,
wherein the linear transformation is configured so that each of the two or more output data symbols carry information of the two or more input data symbols of the group, and
wherein the different signal dimensions comprise a frequency, a time and a space dimension.

2. The transmitter of claim 1 wherein when the different signal dimension comprises the frequency dimension, the output data symbols are transmitted on different subcarriers, wherein a separation between the different subcarriers is based on a number of input data symbols of the group,
wherein when the different signal dimensions comprise the time dimension, the output data symbols are transmitted on different OFDM symbols in time, and
wherein when the different signal dimensions comprise the space dimension, the output data symbols are transmitted on different spatial channels, the different spatial channels generated by beamforming signals with the two or more antennas.

3. The transmitter of claim 2 wherein the input data symbols are mapped to a combination of two or more of the different signal dimensions.

4. The transmitter of claim 1 wherein when the different signal dimension comprises the frequency dimension, the group of two or more input data symbols are initially mapped to non-adjacent subcarriers and transmitter circuitry is configured to modulate each output data symbol for transmission on one of the non-adjacent subcarriers, and
wherein each of the non-adjacent subcarriers carry the information from each of the input data symbols of the group.

5. The transmitter of claim 1 wherein the linear transformation is configured such that the number of constellation points of each output data symbol comprises a product of the number of constellation points of each of the input data symbols of the selected group.

6. The transmitter of claim 5 wherein the linear transformation comprises multiplying the input data symbols by a transformation matrix Q comprising one or more complex numbers, the transformation matrix being selected so that each of the output data symbols carry the information of the two or more input data symbols.

7. The transmitter of claim 6 wherein the transformation matrix has a Frobenius norm that is a constant for transmit power normalization.

8. An OFDM transmitter comprising:
a symbol generator and mapper to map a group of two or more input data symbols to different frequency dimensions;
linear transform circuitry to perform a linear transformation on the group of input data symbols to generate a corresponding two or more output data symbols, each of the output data symbols having an increased number of constellation points;
transmitter circuitry to configure each output data symbol for transmission within one of the different frequency dimensions; and
a controller,
wherein the linear transformation is configured so that each of the two or more output data symbols carry information of the two or more input data symbols of the group, and
wherein the controller is to select the group of input data symbols from the set, wherein the controller selects input data symbols for the group that are mapped to subcarriers that are separated by a total number of subcarriers of the plurality divided by a number of input data symbols in the group to achieve a maximum subcarrier separation between the input data symbols selected for the group.

9. The transmitter of claim 8 wherein the controller is configured to select additional groups of input data symbols from the set of input data symbols, and cause the linear transform circuitry to perform the linear transformation of each group of selected input data symbols to generate corresponding groups of output data symbols,
wherein each group of selected input data symbols corresponds to different non-adjacent subcarriers; and
wherein each input data symbol of the set is mapped to one subcarrier of the plurality of subcarriers that comprise a channel bandwidth.

10. The transmitter of claim 9 wherein the additional groups of input data symbols are selected from the set and the linear transform circuitry is configured to perform the linear transformation of each group of selected input data symbols to generate groups of output data symbols until output data symbols are generated for each subcarrier of the plurality, and
wherein the output data symbols are mapped to each subcarrier and comprise an OFDM symbol configured for transmission.

11. The transmitter of claim 8 wherein the input data symbols comprise first and second input data symbols that are initially mapped to first and second non-adjacent subcarriers, respectively, and
wherein the output data symbols comprise first and second output data symbols for transmission on the first and second non-adjacent subcarriers, respectively,
wherein the increased number of constellation points of each of the output data symbols allows both the first and the second subcarriers to carry all the information of both the first and second input data symbols, and
wherein the output data symbols each have twice the number of constellation points as each of input data symbols.

12. The transmitter of claim 11 wherein the first and second non-adjacent subcarriers are separated by up to half the number of subcarriers that comprise the channel bandwidth.

13. The transmitter of claim 4 wherein the input data symbols comprise first, second, and third input data symbols that are initially mapped to first, second, and third non-adjacent subcarriers, respectively, and
wherein the output data symbols comprise first, second, and third output data symbols configured for transmission on the first, second, and third non-adjacent subcarriers, respectively,
wherein the increased number of constellation points of each of the output data symbols allows the first, second, and third subcarriers to carry all the information of the first, second, and third input data symbols,
wherein the first, second, and third output data symbols each have nine times the number of constellation points as each of input data symbols, and
wherein the first, second, and third non-adjacent subcarriers are separated by up to one-third the number of subcarriers that comprise the channel bandwidth.

14. The transmitter of claim 4 further comprising circuitry to measure interference within the channel bandwidth,
wherein when the measured interference is below a threshold level, the controller is configured to cause the linear transform circuitry to refrain from performing the linear transformation on the input data symbols and cause the transmitter circuitry to configure the input data symbols for modulation on the non-adjacent subcarriers that the input data symbols are initially mapped.

15. The transmitter of claim 14 wherein the interference is based on one of a packet-error-rate or a number of packet retransmissions.

16. The transmitter of claim 4 wherein when longer-term channel information is known, the controller is configured to:
identify subcarriers of the plurality with a better channel quality and subcarriers with a poorer channel quality; and
configure the linear transform circuitry to apply the linear transformation with a power-loading to provide an increased power level for the subcarriers with the better channel quality and to provide a reduced power level for subcarriers with the poorer channel quality.

17. A method of reducing the effects of interference on subcarriers in an OFDM system by symbol loading, the method comprising:
mapping a group of two or more input data symbols to at least two different signal dimensions;
performing a linear transformation on the group of input data symbols to generate a corresponding two or more output data symbols, each of the output data symbols having an increased number of constellation points; and
configuring each output data symbol for transmission within one of the different signal dimensions using two or more antennas,
wherein the linear transformation is configured so that each of the two or more output data symbols carry information of the two or more input data symbols of the group, and
wherein the different signal dimensions comprise a frequency, a time and a space dimension.

18. The method of claim 17 wherein when the different signal dimension comprises the frequency dimension,
the output data symbols are transmitted on different subcarriers, wherein a separation between the different subcarriers is based on a number of input data symbols of the group, wherein when the different signal dimensions comprise the time dimension, the output data symbols are transmitted on different OFDM symbols in time, and wherein when the different signal dimensions comprise the space dimension, the output data symbols are transmitted on different spatial channels, the different spatial channels generated by beamforming signals with the two or more antennas.

19. The method of claim 18 wherein the input data symbols are mapped to a combination of two or more of the different signal dimensions.

20. The method of claim 18 wherein the linear transformation is configured such that the number of constellation points of each output data symbol comprises a product of the number of constellation points of each of the input data symbols of the selected group, wherein the linear transformation comprises multiplying the input data symbols by a transformation matrix Q comprising one or more complex numbers, the transformation matrix being selected so that each of the output data symbols carry the information of the input data symbols, and wherein the transformation matrix has a Frobenius norm that is a constant for transmit power normalization.

21. The method of claim 18 further comprising:

generating a set of input data symbols, wherein each input data symbol of the set is initially mapped to one of the subcarriers of a plurality of subcarriers that comprise a channel bandwidth; and selecting groups of input data symbols from the set, wherein the controller selects input data symbols for each group that are mapped to subcarriers that are separated by a total number of subcarriers of the plurality divided by a number of input data symbols in the group to achieve a maximum subcarrier separation between the input data symbols selected for the group.

22. A system comprising:

two or more antennas; and an OFDM transmitter coupled to the one or more antennas, wherein the OFDM transmitter comprises:

a symbol generator and mapper to map a group of two or more input data symbols to at least two different signal dimensions;

linear transform circuitry to perform a linear transformation on the group of input data symbols to generate a corresponding two or more output data symbols, each of the output data symbols having an increased number of constellation points;

transmitter circuitry to configure each output data symbol for transmission within one of different signal dimensions using the two or more antennas, wherein the linear transformation is configured so that each of the two or more output data symbols carry information of the two or more input data symbols of the group, and wherein the different signal dimensions comprise a frequency, a time and a space dimension.

23. The system of claim 18, wherein when the different signal dimension comprises the frequency dimension, the output data symbols are transmitted on different subcarriers, wherein a separation between the different subcarriers is based on a number of input data symbols of the group, wherein when the different signal dimensions comprise the time dimension, the output data symbols are transmitted on different OFDM symbols in time, and wherein when the different signal dimensions comprise the space dimension, the output data symbols are transmitted on different spatial channels, the different spatial channels generated by beamforming signals with the two or more antennas.

* * * * *